UNITED STATES PATENT OFFICE.

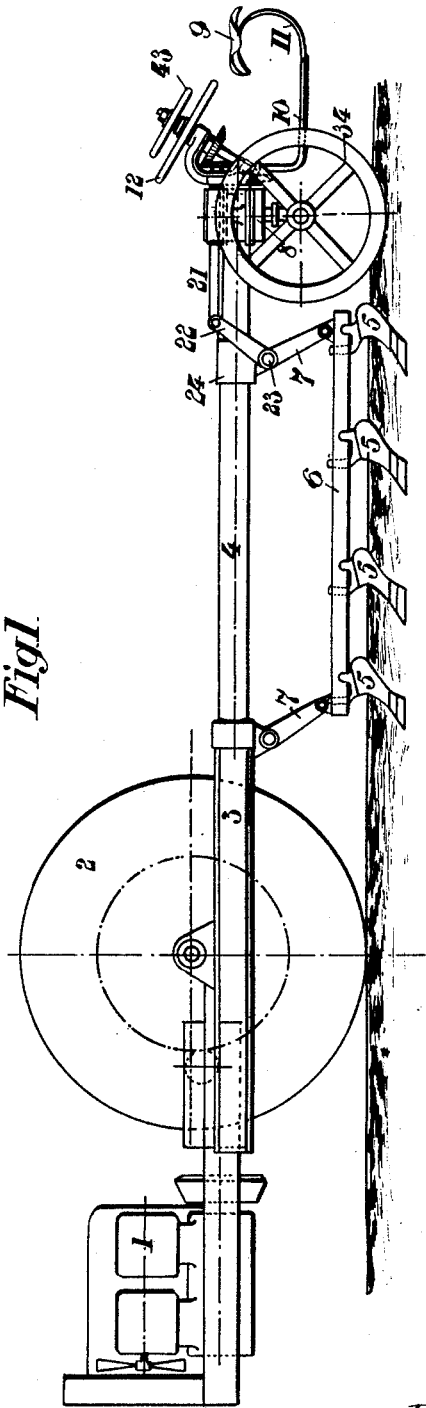

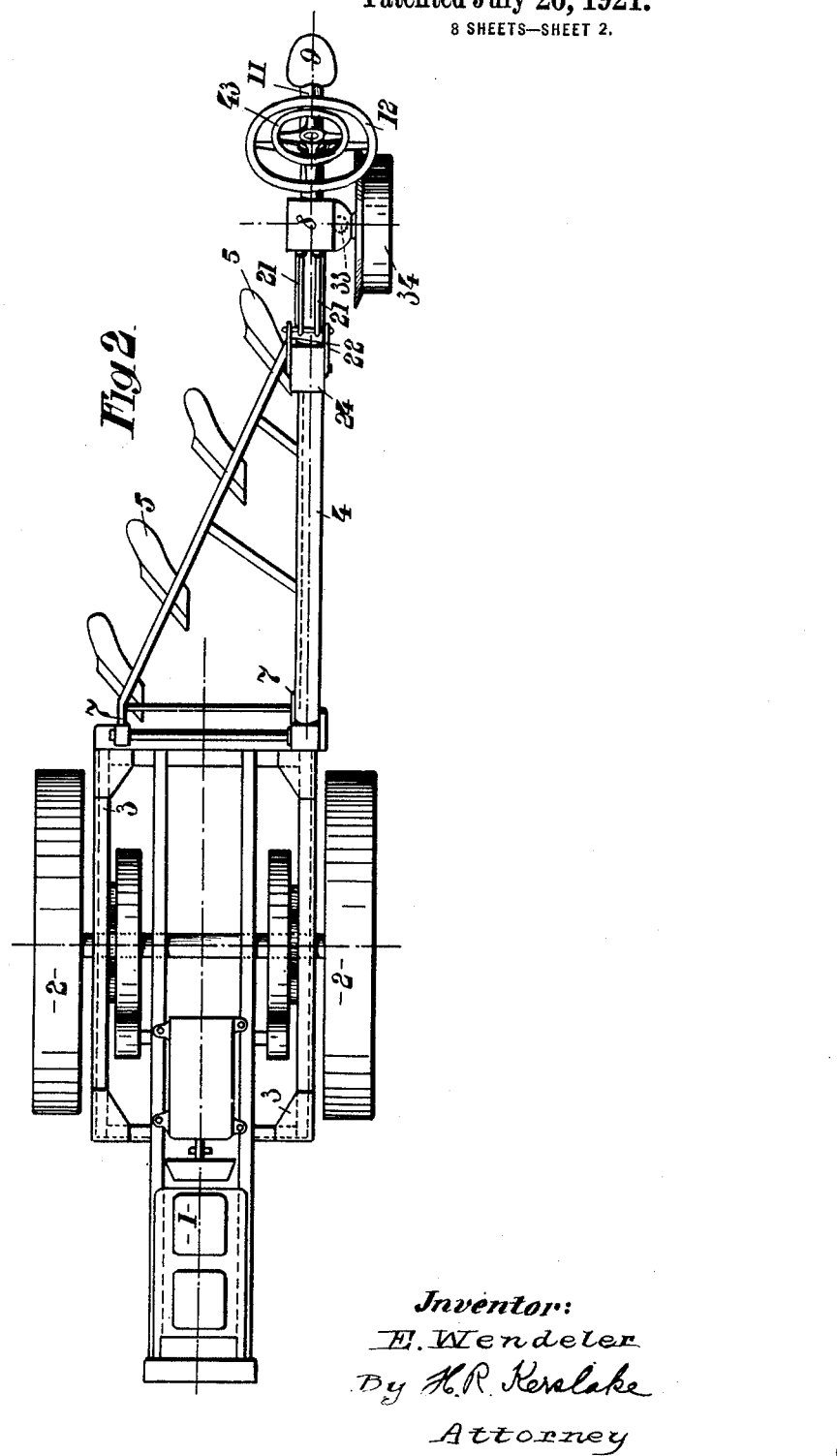

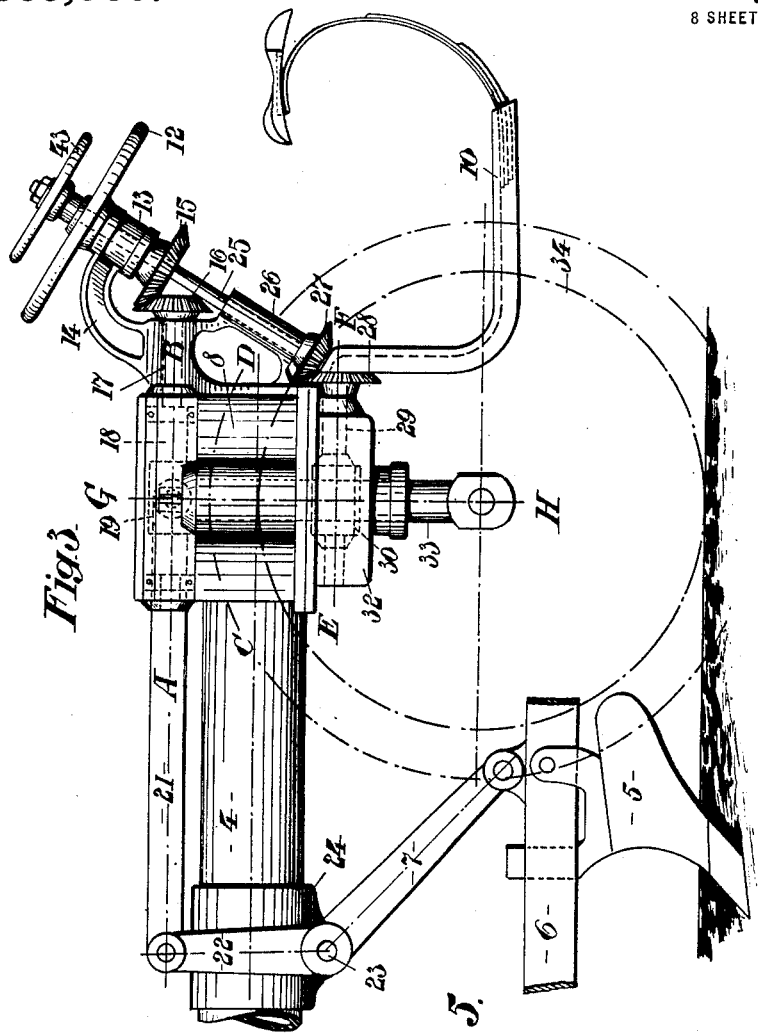

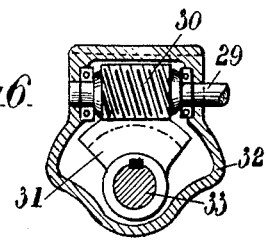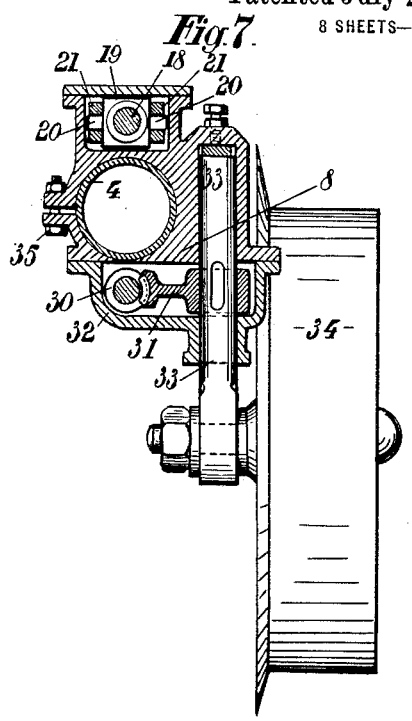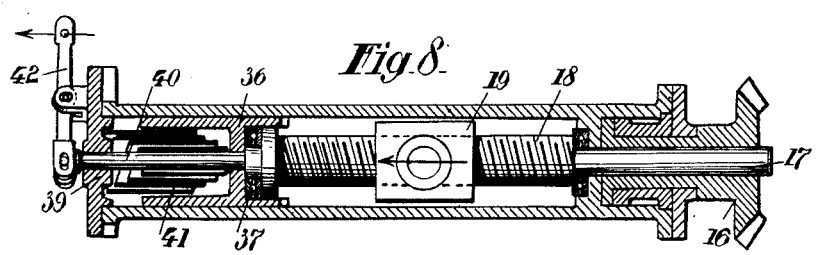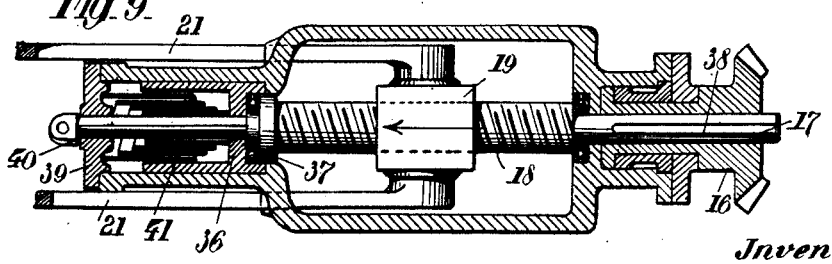

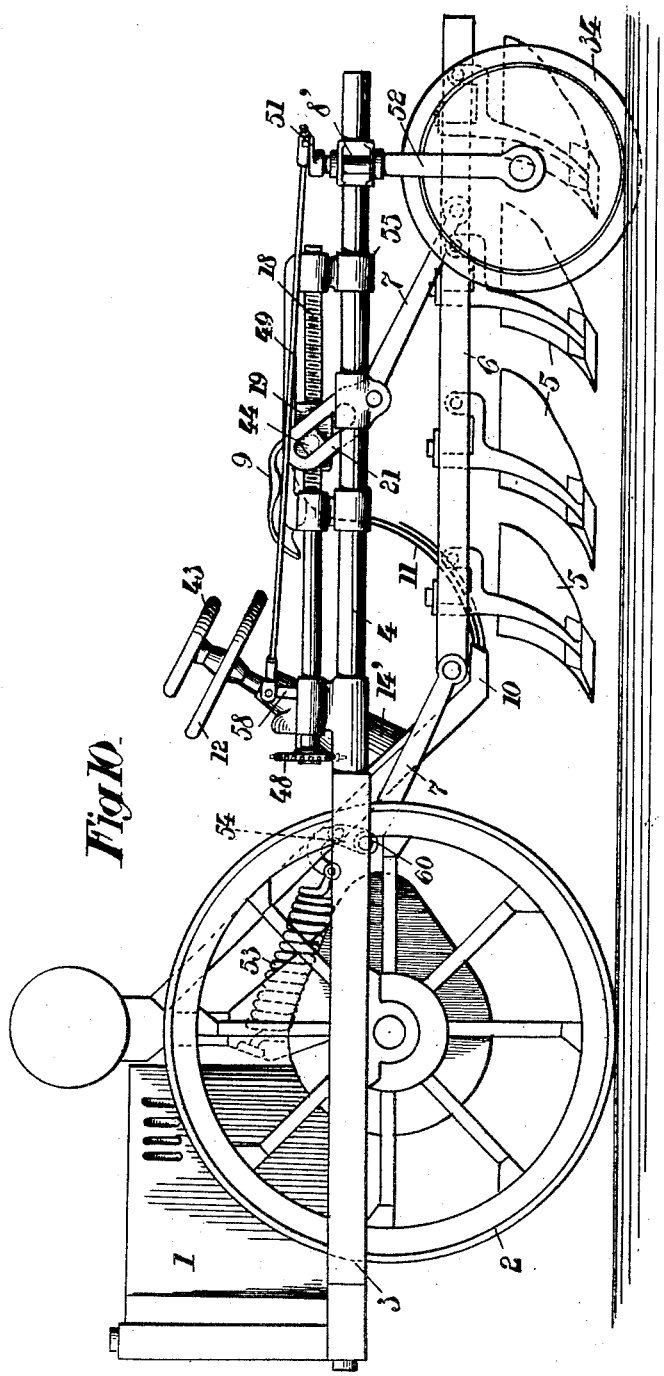

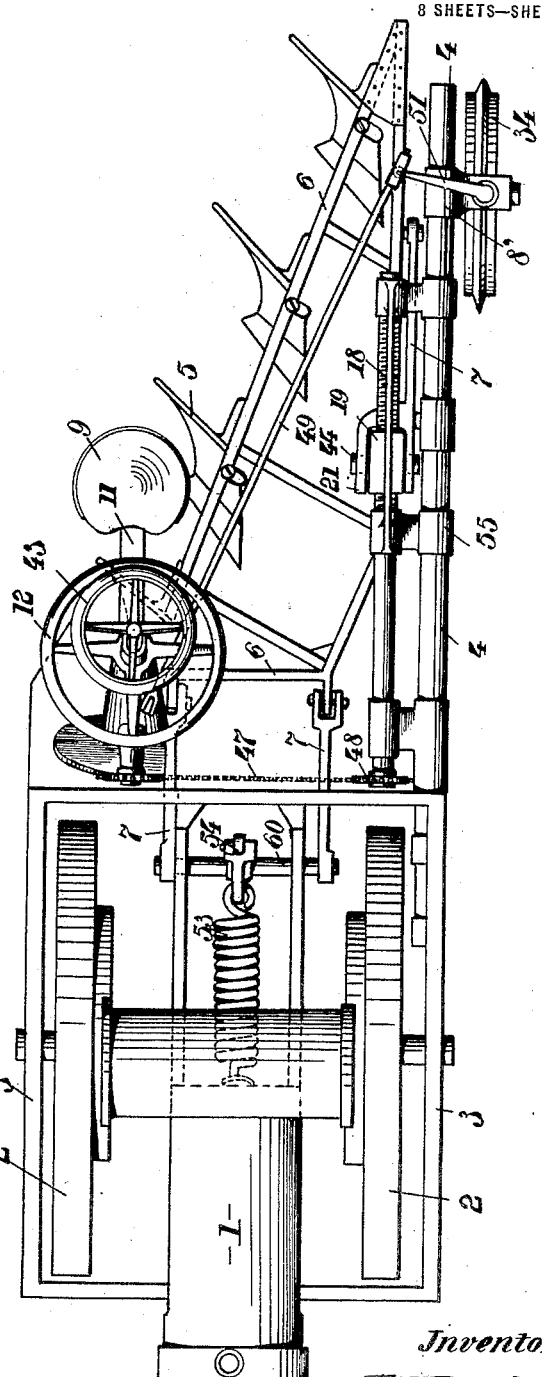

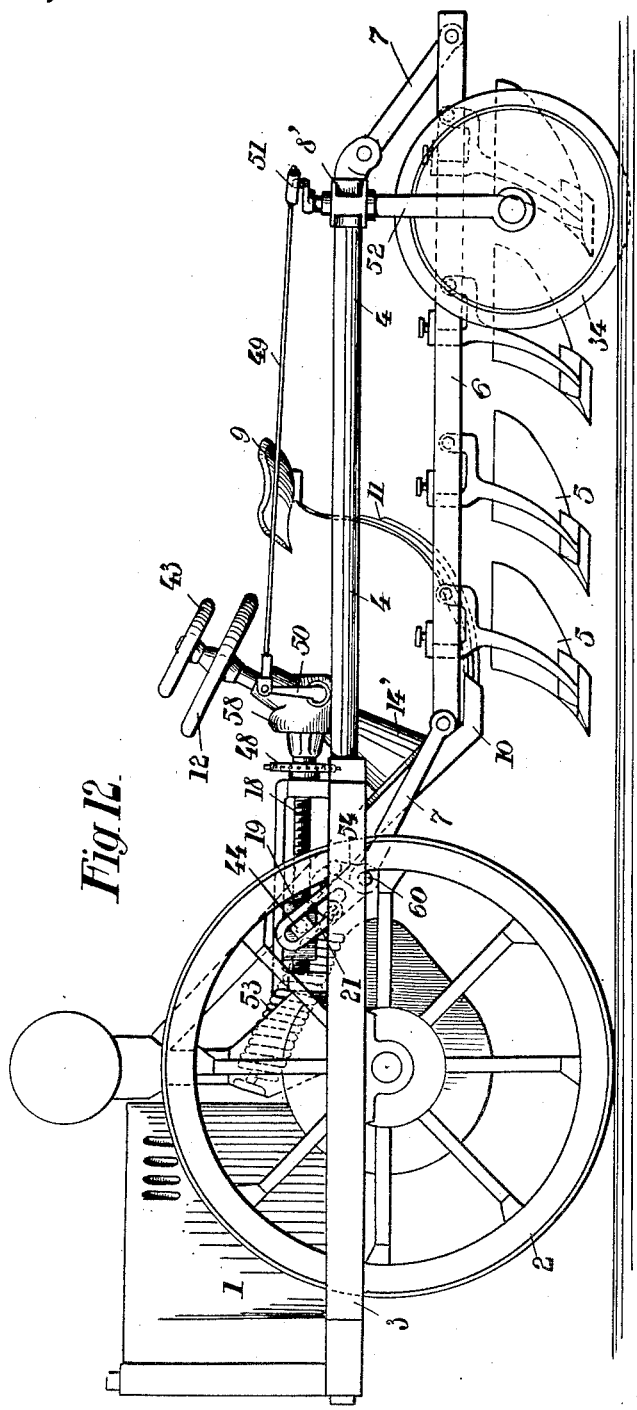

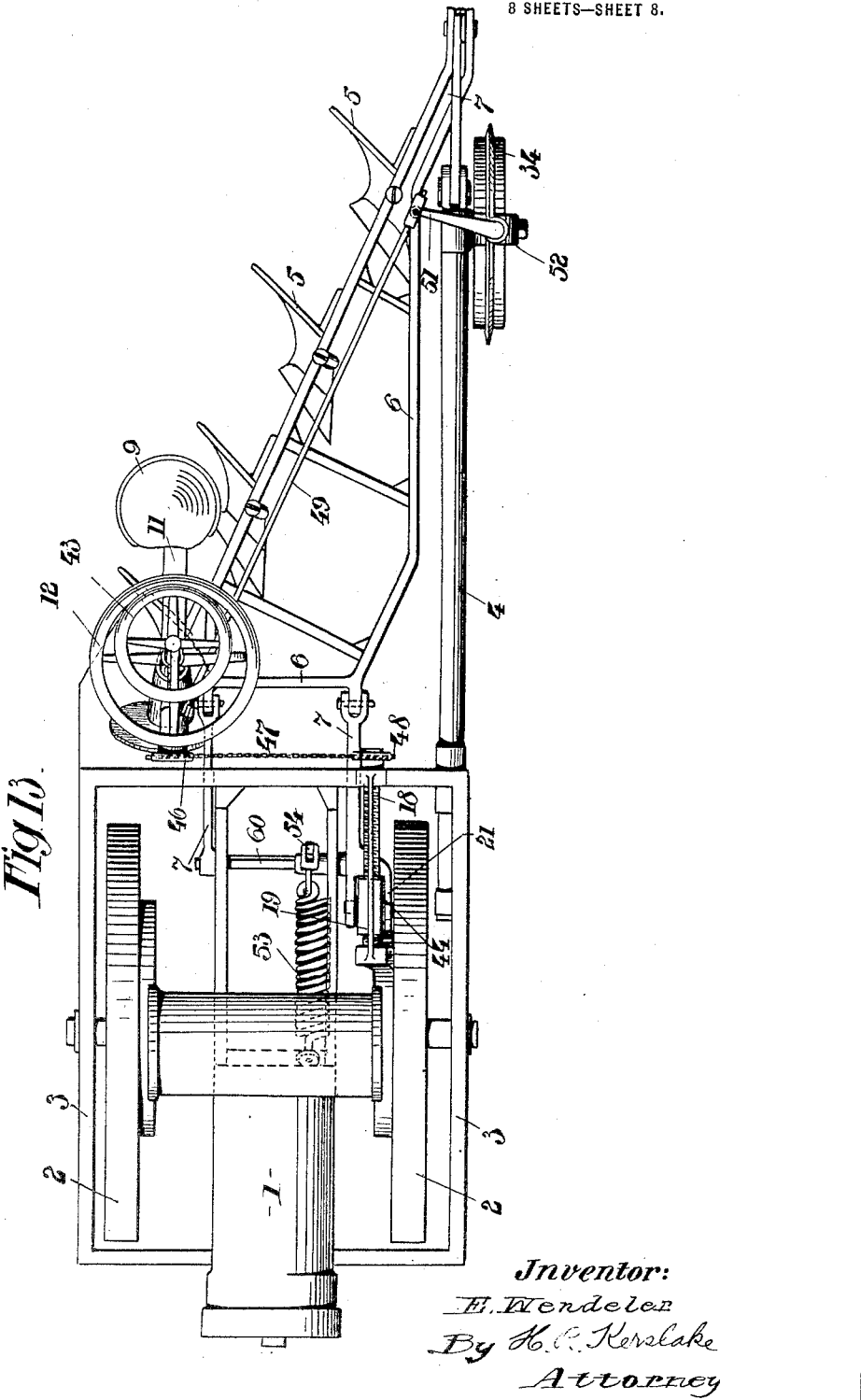

ERNST WENDELER, OF BERLIN, GERMANY, ASSIGNOR TO THE FIRM OF DEUTSCHE KRAFTPFLUG-GESELLSCHAFT M. B. H., OF BERLIN, GERMANY.

MOTOR-PLOW.

1,385,960. Specification of Letters Patent. Patented July 26, 1921.

Application filed May 11, 1920. Serial No. 380,706.

*To all whom it may concern:*

Be it known that I, ERNST WENDELER, engineer, a citizen of Germany, residing at 18 Landshuterstrasse, Berlin, Germany, have invented certain new and useful Improvements in Motor-Plows, (for which I have filed applications in Germany, May 15, 1916; Jan. 20, 1920; Austria, Aug. 21, 1917; Hungary, Sept. 14, 1917; France, Feb. 7, 1920; Austria, Feb. 9, 1920; Belgium, Feb. 11, 1920, Hungary, Jan. 31, 1920; Poland, Feb. 21, 1920,) of which the following is a specification.

My invention relates to motor plows, especially to such in which a separate frame carrying the shares or other tilling tools is provided, said share frame being suspended on the rear part of the carriage frame of the motor plow in such a manner that it may be raised or lowered independently of the carriage frame.

In building up motor plows of this kind there are great difficulties in constructing the rear part of the carriage frame in such a manner that it is very light and at the same time of sufficient resistance. Up to the present the rear part of the carriage of such motor plows is constructed in form of a profile iron frame-work which is of sufficient resistance but rather heavy so that this construction is not well adapted for small motor plows.

According to the present invention the rear part of the carriage frame consists merely of a single beam or girder which preferably is tubular or of box section extending preferably in the prolongation of one of the sides of the short front frame which carries the motor, said beam carrying the rear end of the share frame and being supported upon the soil by the steering wheel of the plow.

The other parts usually carried by the rear part of the frame of the plow, such as the steering mechanism, the device for raising and lowering the share frame and the seat of the conductor, may be suspended on the said beam or rather may be connected directly with the front frame whereby the load upon said beam will be further reduced, unfavorable stress upon the same being avoided. This improved construction permits of giving to the rear frame of the plow a very simple construction and of greatly reducing the weight of the same, so that the invention is particularly adapted for the construction of small motor plows.

In the accompanying drawings the invention is shown by way of example in three forms of construction.

Figures 1 and 2 show, in side elevation and in plan view, a small motor plow constructed according to the invention.

Fig. 3 is a side elevation of the rear end of the plow on a larger scale showing the suspension of the rear end of the share or tool frame, the device for raising and lowering the share frame, the steering mechanism and the seat of the conductor.

Figs. 4, 5 and 6, are horizontal sections along the lines A—B, C—D and E—F of Fig. 3 showing parts of the raising device, of the beam forming the rear frame, and of the steering mechanism respectively.

Fig. 7 is a vertical section along line G—H of Fig. 3.

Figs. 8 and 9 are a vertical and a horizontal section showing a second form of construction of the raising device.

Figs. 10 and 11 and 12 and 13 show two other forms of construction in side elevation and plan view respectively.

In all three forms of construction the carriage of the plow consists essentially of a frame carried by the running or driving wheels 2, said frame being only slightly longer than the diameter of the running wheels. This frame, which carries upon its front end the motor 1, has at the left hand side an extension 4 forming the prolongation of the corresponding side part of the frame and consisting in the preferred form of a tubular beam. This beam represents all the rear frame of the plow and it is supported at its rear end by the wheel 34, the latter serving at the same time for steering the plow. The frame 6 which supports the plow shares 5 is articulated by means of the levers 7 to the rear end of the front frame 3 and to the rear end of the tubular beam 4 respectively.

According to the form of construction shown in Figs. 1 and 2, the raising device for the supporting frame for the plow shares as well as the steering mechanism, are mounted upon a bearing piece or bracket 8 clamped upon the rear end of the beam 4 by means of screws 35, the seat 9 for the conductor being also fixed to the rear end of the beam 4 by means of the support 10 and the supporting springs 11. The raising device and the steering mechanism may be comfortably operated from the said seat.

The raising of the share or tool frame 6 is effected by means of the hand wheel 12, the hollow spindle 13 of which (Fig. 3) is guided in an extension 14 of the bracket 8. A bevel wheel 15, keyed upon the spindle 13, meshes with a bevel wheel 16, the shaft 17 of which is also mounted in the said extension 14. The shaft 17 carries the screw spindle 18 with nut 19. To lateral studs 20 of said nut 19 the connecting rods 21 are attached. The other ends of these rods 21 are pivoted to the upper ends of the levers 22, the pivot pin 23 of which is mounted in the thickened part of a clip 24, placed upon the tubular beam 4. The rear supporting lever 7 of the share frame 6 is fixed with its upper end to the pivot pin 23.

The steering device, which is also to be operated from the seat 9, comprises the hand wheel 43 arranged above the hand wheel 12 of the raising device, the spindle 25 of the hand wheel 43 traversing the hollow spindle of the hand wheel 12 and the ring-shaped bevel wheel 15. The said spindle 25 is further guided in a tubular extension 26 of the bracket 8 and carries at its lower end the bevel wheel 27 which meshes with the bevel wheel 28. The horizontal spindle 29 of the bevel wheel 28, together with the worm 30 (Fig. 6) and the toothed sector 31 are mounted in the lower part 32 of the bracket 8. The toothed sector 31 is directly mounted upon the steering shaft 33 of the steering wheel 34, said shaft being also located in the bracket 8. The special arrangement of the raising device and the steering mechanism in a common bearing piece, mounted upon the rear frame formed by a single beam, insures a very light and compact construction avoiding the usual multiple lever transmissions which require an increased expense of energy without permitting of a uniform action of energy in all positions of the levers. This refers also to the steering device, the usual construction of which requires several lever connections between the worm wheel and the steering shaft. The modified form of construction of the raising device shown in Figs. 8 and 9 is particularly designed to soften the shocks to which the share frame is submitted when the shares come suddenly in contact with large stones and other obstacles, this form of construction being further designed for the automatic throwing out of gear of the coupling of the motor under the said circumstances. With this object in view the screw spindle 18 driven by the bevel wheel 16 and carrying the nut 19 with its connecting rods 21, is exposed to the action of a buffer spring 41 located in an extension of the bracket 8. The said spring is put under tension before it is mounted in its bearing. The connection between the screw spindle 18 and the spring 41 is effected through the intermediary of a hollow piston 36 which incloses the said spring and serves at the same time as a bearing (ball bearing 37) for the front end of the spindle 18 and for guiding the same in the bracket 8 when the said spindle is being displaced in longitudinal direction. In order to facilitate the displacement of the spindle, the driving bevel wheel 16 is guided upon the shaft 17, which carries the said screw spindle, by a slot and key 38 so that it takes the shaft along only in the direction of rotation. The spring 41 bears against the lid 39. If there happen suddenly strong shocks, the pull on the connecting rods 21 will be caught by the counter-acting tension of spring 41 if the said pull is greater than the tension. Finally the coupling of the motor will be thrown out of gear through the intermediary of the rod 40 fixed to the spindle 18 and the two-armed lever 42 mounted upon the lid 39, the plow being thus stopped. Defects and fractures are thus avoided.

If, however, for raising the share frame, a nut should be used which rotates but does not move in axial direction, in which case the connecting rods of the supporting levers of the share frame would be connected with the screw spindle carrying the said nut but prevented from rotating, it is evident that it would be the nut which must be supported by the spring.

According to the form of construction shown in Figs. 10 and 11, a simple clip 8' is substituted for the bearing piece or bracket 8 mounted upon the rear end of the beam 4, said clip carrying merely the vertical rotatable support 52 of the steering wheel 34. All the other parts, which according to the first form of construction hereinbefore described, were mounted upon the bracket 8 are now placed farther forward, the mechanism for steering the plow and the device for raising and lowering the share frame comprising the hand wheels 12 and 43, as well as the seat 9 for the conductor and the support 10 of the same being mounted at the right hand side of the rear end of the front carriage. The steering of the plow is effected through the intermediary of a rod 49, the rear end of which is connected with the lever 51, its front end being connected with the steering gear controlled by the hand wheel 43 and located in the socket 14'.

The screw gear for the raising and lowering of the share frame is mounted, according to Figs. 10 and 11, upon the front part of the beam 4. It comprises, as hereinbefore described, a rotatable screw spindle 18 mounted in two bearings fixed upon the beam 4 by means of clips 55. The screw spindle is operated by means of a chain wheel 48 which is connected with a second chain wheel 46 mounted in the socket 14', through a chain 47. The nut 19 of the screw spindle 18 engages with two lateral studs with blocks 44 adapted to slide in slots of the upper fork-shaped end of the lever 21. This lever is rigidly connected with the rear supporting levers 7. Two front supporting levers 7 are pivoted upon a shaft 60 mounted in the front frame 3, another short lever 54 being rigidly connected with said cross shaft 60. A spiral spring 53 fixed with its other end to the front frame 3, acts upon the said lever 54 and is designed to facilitate the raising of the share frame by means of the screw gear.

The form of construction shown in Figs. 12 and 13 differs from the form of construction which has just been described in so far that also the screw gear for the raising and lowering of the share frame is mounted upon the front carriage. The lever 21 is in this case connected with one of the front levers 7 carrying the share frame. The rotation of the screw spindle is also affected through the hand wheel 12 by means of a chain 47 which connects the two chain wheels 46 and 48. The third lever 7 is articulated at the extreme rear end of the tubular beam 4 and pivoted to the rear end of the share frame 6.

The buffer-spring device described with reference to Figs. 8 and 9 evidently may be used also in combination with the constructional form of the motor plow described with reference to Figs. 10 to 12. Instead of the tubular beam shown, a beam or girder of rectangular or other cross section may be used.

I claim:

1. In a motor plow, a carriage frame and a share frame suspended on said carriage frame, the rear part of said carriage frame consisting of a single beam only.

2. In a motor plow, a carriage frame and a share frame suspended on the rear part of said carriage frame, the main portion of the rear part of the carriage frame consisting of a single beam only.

3. In a motor plow comprising driving wheels and a steering wheel, a carriage frame comprising a short front frame carrying the motor and being supported by the driving wheels and a rear part supported by the steering wheel, and a share frame in connection with said carriage frame and being adapted to be raised and lowered independently of the carriage frame, said rear part of the carriage frame consisting of a single hollow beam only.

4. In a motor plow a carriage frame comprising a short front frame and a rear part, and a share frame in connection with said carriage frame and being adapted to be raised and lowered independently of the carriage frame, said rear part consisting of a prolongation of one side of said front frame and forming a single beam.

5. In a motor plow a carriage frame comprising a short front frame and a rear part, and a share frame at its front end pivotally suspended on said front frame and at its rear end pivotally suspended on said rear part, said rear part consisting of a single hollow beam forming a prolongation of one side of said front frame.

6. In a motor plow a carriage frame comprising a short front frame and a rear part, and a share frame suspended on said carriage frame, said rear part consisting of a single tubular beam only forming a prolongation of one side of said front frame and being supported by a wheel.

7. In a motor plow a carriage frame, a share frame suspended on the rear part of said carriage frame, said rear part consisting of a single beam only, and a device for raising and lowering said share frame, said raising and lowering device being mounted at the rear end of said carriage frame.

8. In a motor plow a carriage frame, a share frame, levers for suspending the share frame on the rear part of said carriage frame, said rear part consisting of a single beam only, a device for raising and lowering said share frame, said device comprising a gearing acting immediately on said share frame levers, said raising and lowering device and said gearing being mounted on said carriage frame.

9. In a motor plow comprising driving wheels and a steering wheel, a carriage frame comprising a short front frame carrying a motor and supported by the driving wheels and a rear part supported by the steering wheel, a share frame in connection with said carriage frame and being adapted to be raised and lowered independently of the carriage frame, said rear part consisting only of a single tubular beam forming a prolongation of one side of said front frame and being supported by said steering wheel, a device for raising and lowering said share frame, said device comprising a gearing acting on said share frame, said raising and lowering device being mounted on said front frame.

10. In a motor plow, a carriage frame, levers pivotally connected to said frame, a share frame pivotally connected to said levers and carried by the same, a threaded bar supported by the carriage frame, means for turning said threaded bar, a nut mounted on the threaded bar, means connecting said threaded bar to one of said levers, and resilient means coöperating with the threaded bar to permit axial movement of the same when strain is placed upon the share frame in one direction.

11. A motor plow of the kind defined by claim 10 in which the threaded bar is slidably mounted in the casing, and in which the resilient means includes a piston slidably mounted in the casing, and a spring bearing against the piston and a portion of said casing.

12. A combination of the kind defined by claim 10 in which the threaded bar is provided with a connection to permit the same to be connected with a portion of the plow motor.

13. A motor plow including a frame consisting of a rectangular main portion, supporting wheels for the main portion of the frame, a motor carried by the main portion of the frame, a single bar forming a rearward extension of the main frame and constituting alone the rear portion of the frame, a share frame carried by said frame and having its major portion arranged at one side of the rear portion of the carriage frame, and means for raising the share frame.

In testimony whereof I affix my signature in presence of two witnesses.

ERNST WENDELER.

Witnesses:
KÄTHE LEECH,
MAX JABLOWSKI.